US008640047B2

(12) United States Patent
Mouton et al.

(10) Patent No.: US 8,640,047 B2
(45) Date of Patent: Jan. 28, 2014

(54) ASYNCHRONOUS HANDLING OF A USER INTERFACE MANIPULATION

(75) Inventors: Laurent Mouton, Bellevue, WA (US); Nicolas J. Brun, Seattle, WA (US); Ross N. Luengen, Sammamish, WA (US); Song Zou, Bellevue, WA (US); Nicholas R. Waggoner, Newcastle, WA (US)

(73) Assignee: Micorsoft Corporation, Redmond, WA (US)

( * ) Notice: Subject to any disclaimer, the term of this patent is extended or adjusted under 35 U.S.C. 154(b) by 195 days.

(21) Appl. No.: 13/150,762

(22) Filed: Jun. 1, 2011

(65) Prior Publication Data

US 2012/0311488 A1  Dec. 6, 2012

(51) Int. Cl.
*G06F 3/048* (2013.01)
*G06F 3/00* (2006.01)

(52) U.S. Cl.
USPC ........... 715/786; 715/784; 715/798; 715/799; 715/800

(58) Field of Classification Search
USPC ..................... 715/798, 799, 800, 784, 786
See application file for complete search history.

(56) References Cited

U.S. PATENT DOCUMENTS

| 7,088,374 | B2* | 8/2006 | David et al. ................ 345/619 |
| 7,417,644 | B2* | 8/2008 | Cooper et al. ............. 345/619 |
| 7,548,237 | B2* | 6/2009 | David et al. ................ 345/420 |
| 7,721,308 | B2* | 5/2010 | Finger et al. ................. 725/37 |
| 8,386,959 | B2* | 2/2013 | Rohrabaugh et al. ...... 715/815 |
| 2006/0103655 | A1 | 5/2006 | Nelson et al. |
| 2007/0035543 | A1* | 2/2007 | David et al. ................ 345/420 |
| 2007/0157089 | A1 | 7/2007 | Van Os et al. |
| 2008/0309630 | A1 | 12/2008 | Westerman |
| 2009/0184939 | A1 | 7/2009 | Wohlstadter et al. |
| 2010/0146458 | A1 | 6/2010 | Wadekar |
| 2010/0177049 | A1 | 7/2010 | Levy et al. |
| 2010/0251112 | A1 | 9/2010 | Hinckley et al. |
| 2010/0281402 | A1* | 11/2010 | Staikos et al. ............. 715/760 |
| 2011/0072391 | A1* | 3/2011 | Hanggie et al. ............ 715/800 |

FOREIGN PATENT DOCUMENTS

KR  1020100020311 A  2/2010
KR  1020110037761 A  4/2011

OTHER PUBLICATIONS

"International Search Report", Mailed Date: May 15, 2012, Application No. PCT/US2011/055530, Filed Date: Oct. 9, 2011, pp. 9.
North, et al., "Understanding Multi-touch Manipulation for Surface Computing", Retrieved at <<http://research.microsoft.com/en-us/um/redmond/groups/cue/publications/interact2009-multitouch.pdf, 2009, pp. 14.
"Intuitive User Experience",Retrieved at <<http://msdn.nnicrosoft.com/en-us/library/dd371715(VS.85).aspx>>, Retrieved Date: Jan. 6, 2011, pp. 2.

* cited by examiner

*Primary Examiner* — Nicholas Augustine
(74) *Attorney, Agent, or Firm* — Wolfe-SBMC (57) ABSTRACT

This document describes techniques and apparatuses for asynchronous handling of a user interface manipulation. These techniques handle a user interface manipulation with two or more asynchronous processes. One asynchronous process, for example, may determine a position responsive to the user interface manipulation while another asynchronous process determines the pixels to render. By so doing, these techniques enable a quick and/or consistent response to a user interface manipulation.

20 Claims, 11 Drawing Sheets

ASYNCHRONOUS HANDLING OF A USER INTERFACE MANIPULATION

BACKGROUND

Gestures and other user interface manipulations permit users to manipulate content within application interfaces. These manipulations permit zooming in or out of a map, panning through a list, and rotating a picture, to name just a few. Conventionally, an application associated with the application interface receives a user interface manipulation, calculates a response to the manipulation, and then renders content in the application interface. This and many other conventional techniques, however, can result in a poor user experience.

SUMMARY

This document describes techniques and apparatuses for asynchronous handling of a user interface manipulation. These techniques handle a user interface manipulation with two or more asynchronous processes. One asynchronous process, for example, may determine a position responsive to the user interface manipulation while another asynchronous process determines the pixels to render. By so doing, these techniques enable a quick and/or consistent response to a user interface manipulation.

This summary is provided to introduce simplified concepts for asynchronous handling of a user interface manipulation that are further described below in the Detailed Description. This summary is not intended to identify essential features of the claimed subject matter, nor is it intended for use in determining the scope of the claimed subject matter. Techniques and/or apparatuses for asynchronous handling of a user interface manipulation are also referred to herein separately or in conjunction as the "techniques" as permitted by the context.

BRIEF DESCRIPTION OF THE DRAWINGS

Embodiments for asynchronous handling of a user interface manipulation are described with reference to the following drawings. The same numbers are used throughout the drawings to reference like features and components.

DETAILED DESCRIPTION

Overview

Before fully describing these techniques and apparatuses for asynchronous handling of a user interface manipulation, this document considers a conventional technique in which user interface (UI) manipulations are handled with a single process on a user interface thread. This conventional technique can provide a poor user experience because the single process performs too many other operations or because it pre-renders content in addition to handling where that content is to be rendered. Thus, this conventional technique may result in a failure to quickly provide a positional response or to quickly fetch and render content. Failing to quickly provide a positional response can result in a jerky or disconnected user experience. Failing to quickly fetch and render content can result in blank portions of a viewport on an application interface. If a user attempts to pan down a news article to see new pages of content, for example, this conventional technique may present blank pages while the manipulation is being handled.

The techniques and apparatuses described herein, however, enable a quick and/or consistent response to a UI manipulation. A user panning through the news article noted above may immediately see new pages of the article, rather than a blank page, while also enjoying a responsive user experience. Furthermore, in some embodiments, these techniques enable a consistent user experience across numerous different applications and application interfaces. Ways in which the techniques may do so are set forth below.

This discussion proceeds to describe an example environment in which the techniques may operate, methods performable by the techniques, and an example apparatus.

Example Environment

Figure 1:
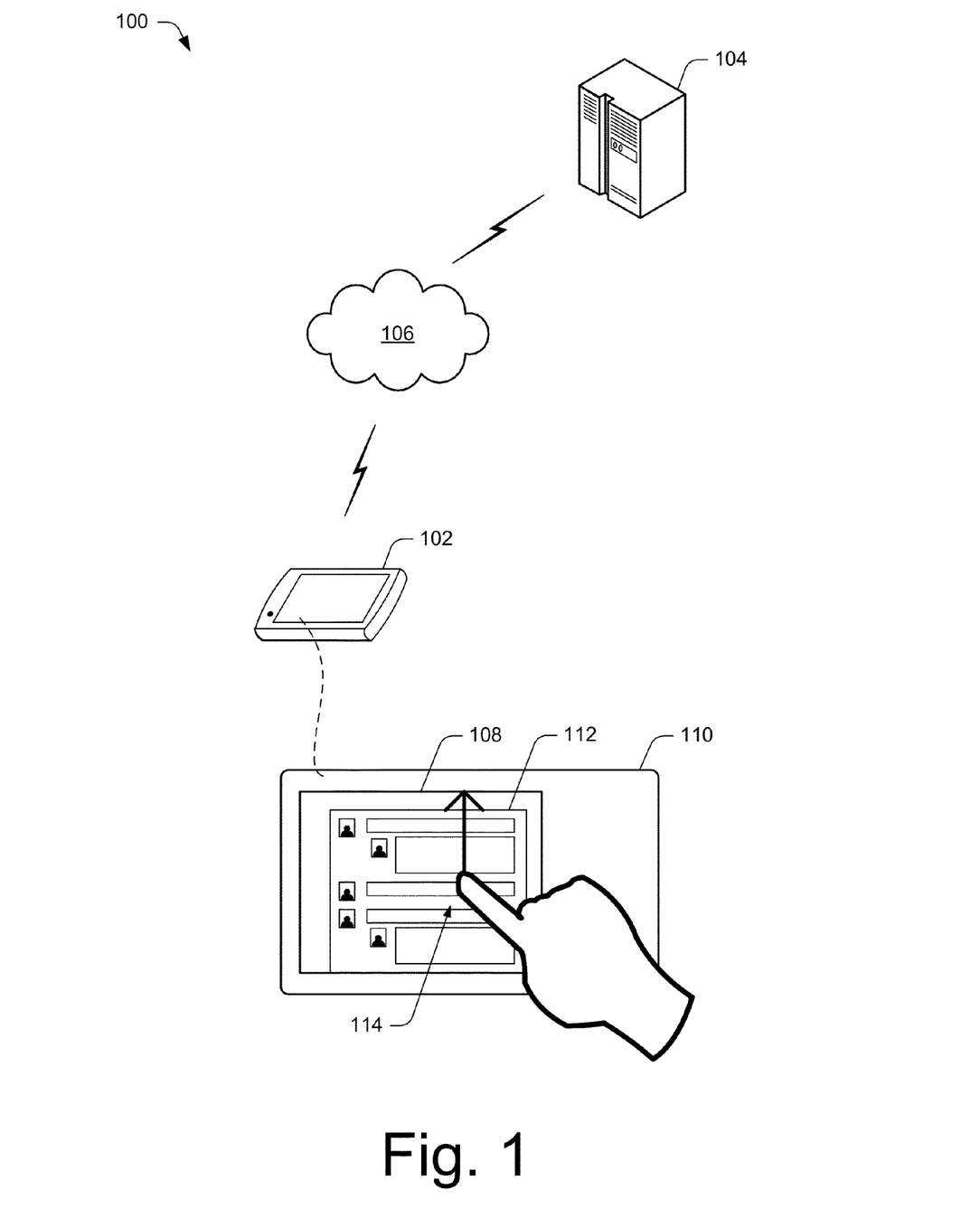
FIG. 1 illustrates an example system in which techniques for asynchronous handling of a user interface manipulation can be implemented.

FIG. 1 illustrates an example environment 100 in which techniques for asynchronous handling of a user interface manipulation can be embodied. Environment 100 includes a computing device 102, remote provider 104, and communication network 106, which enables communication between these entities. Computing device 102 presents an application interface 108 on touch-screen display 110. Application interface 108 includes viewport 112, through which content is displayed to a user and in many case through which a user interface (UI) manipulation is received.

User manipulations may include numerous types of user inputs and input devices, such as using a mouse to click on selectable controls or to make a mouse-based gesture, using one or multi-fingered gestures through a touch-screen display, and using voice activation. User manipulations, whether through gestures or otherwise, may permit zooming in or out (e.g., higher or lower resolution), panning in two dimensions, rotating (in two or three dimensions), transformations, translations, and affine transforms (e.g., a linear transformation and translation together), and others.

By way of example, consider user manipulation 114 shown in FIG. 1. User manipulation 114 is a flick-up, single-finger gesture intended to quickly pan through content shown in viewport 112. User manipulation 114 is received at viewport 112 and through touch-screen display 110. While gestures are often used as example UI manipulations throughout this document, non-gesture manipulations may also or instead be used.

Figure 2:
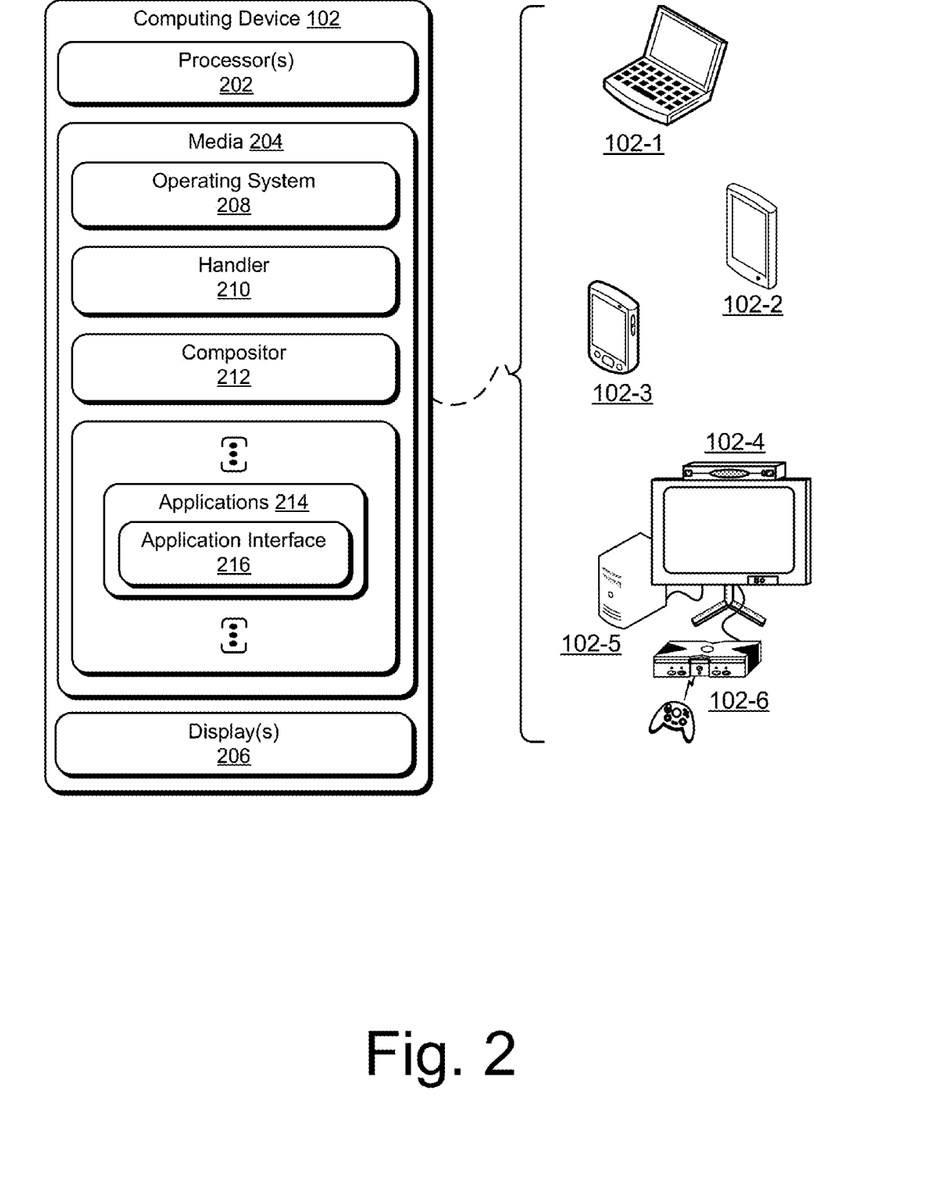
FIG. 2 illustrates an example embodiment of the computing device of FIG. 1.

FIG. 2 illustrates an example embodiment of computing device 102 of FIG. 1, which is illustrated with six examples devices: a laptop computer 102-1, a tablet computer 102-2, a smart phone 102-3, a set-top box 102-4, a desktop computer 102-5, and a gaming device 102-6, though other computing devices and systems, such as servers and netbooks, may also be used.

Computing device 102 includes or has access to computer processor(s) 202, computer-readable storage media 204 (media 204), and one or more displays 206, four examples of which are illustrated in FIG. 2. Media 204 includes an operating system 208, handler 210, compositor 212, and applications 214, each of which is capable of providing an application interface 216. In some cases application 214 provides application interface 216 in conjunction with a remote device, such as when the local application is a browser and the remote device includes a network-enabled service provider.

Generally, handler 210 determines a position in content responsive to a UI manipulation, the position associated with a portion of the content for display in response to the manipulation. This position includes information usable to manipulate display of the content, such as a location in the content, a resolution change, or an orientation change, to name a few. Handler 210 may be an application, applet, or other entity capable of communicating with application 214 and/or compositor 212.

Generally, compositor 212 renders pre-rendered content received from one entity (previously or contemporaneously) based on a position received from another entity, such as pre-rendered content from application 214 and position from handler 210. Compositor 212 can include a graphics card or other entity that displays pixels on a screen.

Application 214 pre-renders the portion of content associated with the position determined by handler 210 for rendering by compositor 212, or, in some cases, for rendering by application 214. If the content portion associated with the position is already pre-rendered (e.g., the UI manipulation moves content that is currently displayed or stored), application 214 may forgo pre-rendering that same content portion.

As noted in part above, handler 210 operates asynchronously from application 214, and in some cases also compositor 212. Handler 210 operates asynchronously at least by determining a position corresponding to a UI manipulation separate from an entity that pre-renders content, which is often performed by application 214. Various examples of asynchronous behavior include handler 210 being part of a different computational process, and/or operating on a different CPU or CPU thread, than application 214. A CPU thread on which handler 210 operates may be dedicated to determining position for a UI manipulation, rather than pre-rendering or other functions, thereby offering a responsive user experience. Compositor 212 may operate asynchronously from either handler 210 or application 214, or may be synchronous with either handler 210 or application 214.

Furthermore, in some cases a UI manipulation does not result in a new content portion needing to be pre-rendered, instead already pre-rendered (or rendered) content is being manipulated. In such a case, asynchronous handling of this UI manipulation is not slowed down by operating on a thread that may be performing other operations, such as in some user interface threads in which an application may operate.

Figure 3:
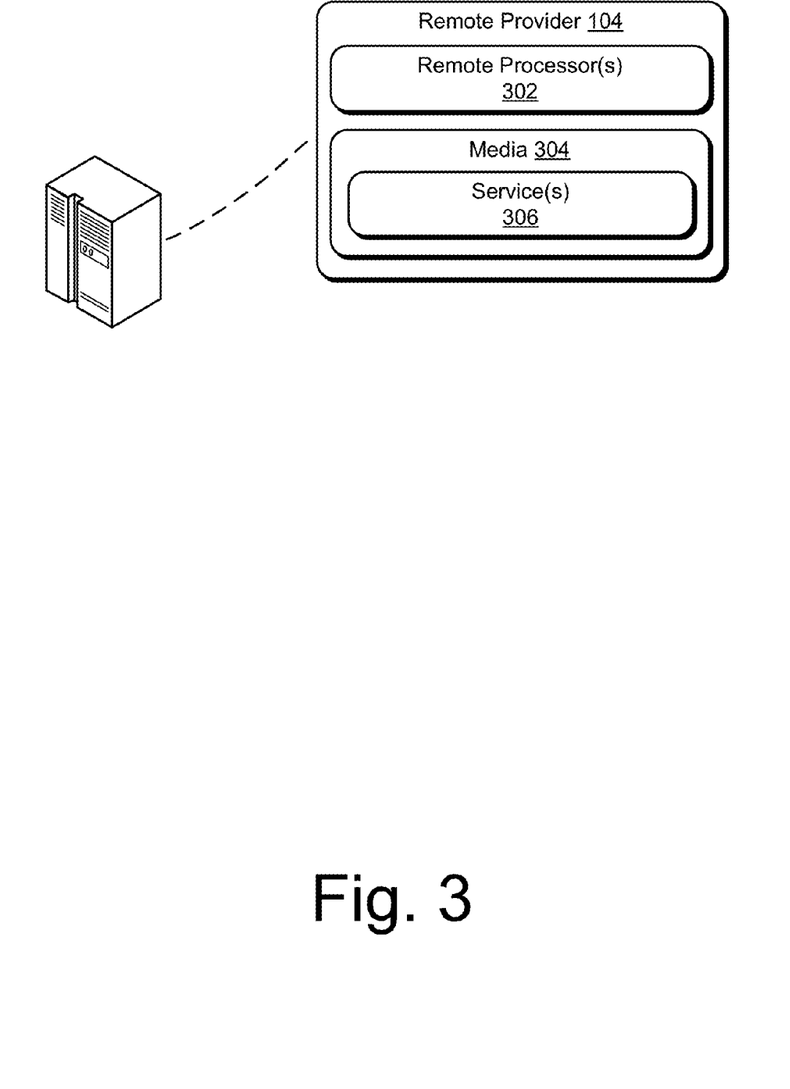
FIG. 3 illustrates an example embodiment of the remote provider of FIG. 1.

FIG. 3 illustrates an example embodiment of remote provider 104. Remote provider 104 is shown as a singular entity for visual brevity, though multiple providers are contemplated by the techniques. Remote provider 104 includes or has to access to provider processor(s) 302 and provider computer-readable storage media 304 (media 304). Media 304 includes services 306, which interact with users through application interfaces 216 of computing device 102 (e.g., displayed on display 206 or touch-screen display 110). Thus, in some cases service 306 may perform actions of application 214 or act in conjunction with application 214, such as in cases where application 214 is a web browser.

Ways in which entities of FIGS. 1-3 act and interact are set forth in greater detail below. The entities illustrated for computing device 102 and/or remote provider 104 can be separate or integrated to the extent permitted by asynchronous operations described herein, such as handler 210 being integral with or separate from operating system 208.

Example Methods

Figure 4:
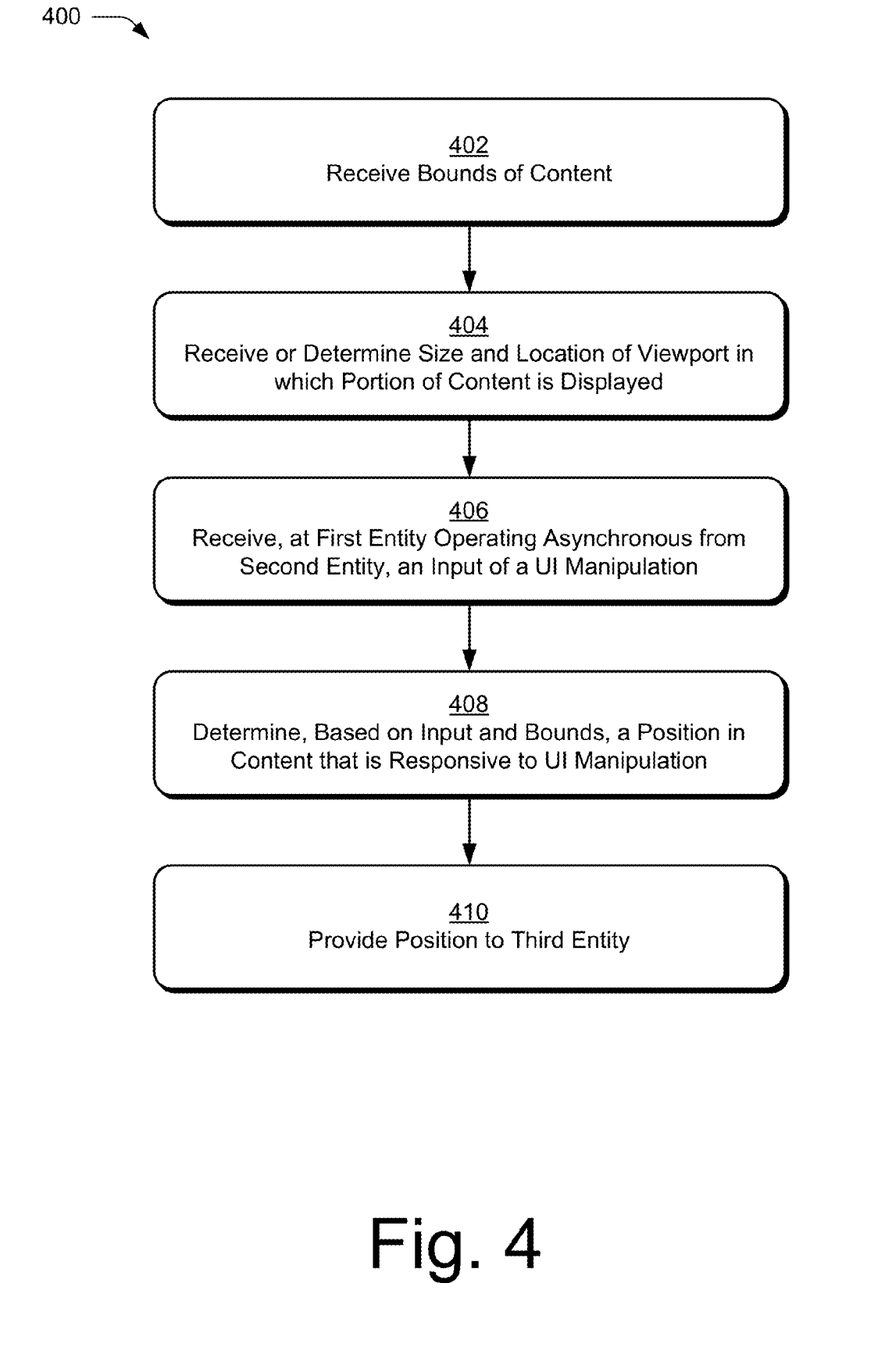
FIG. 4 illustrates an example method for asynchronous handling of a UI manipulation directed to three entities.
Figure 9:
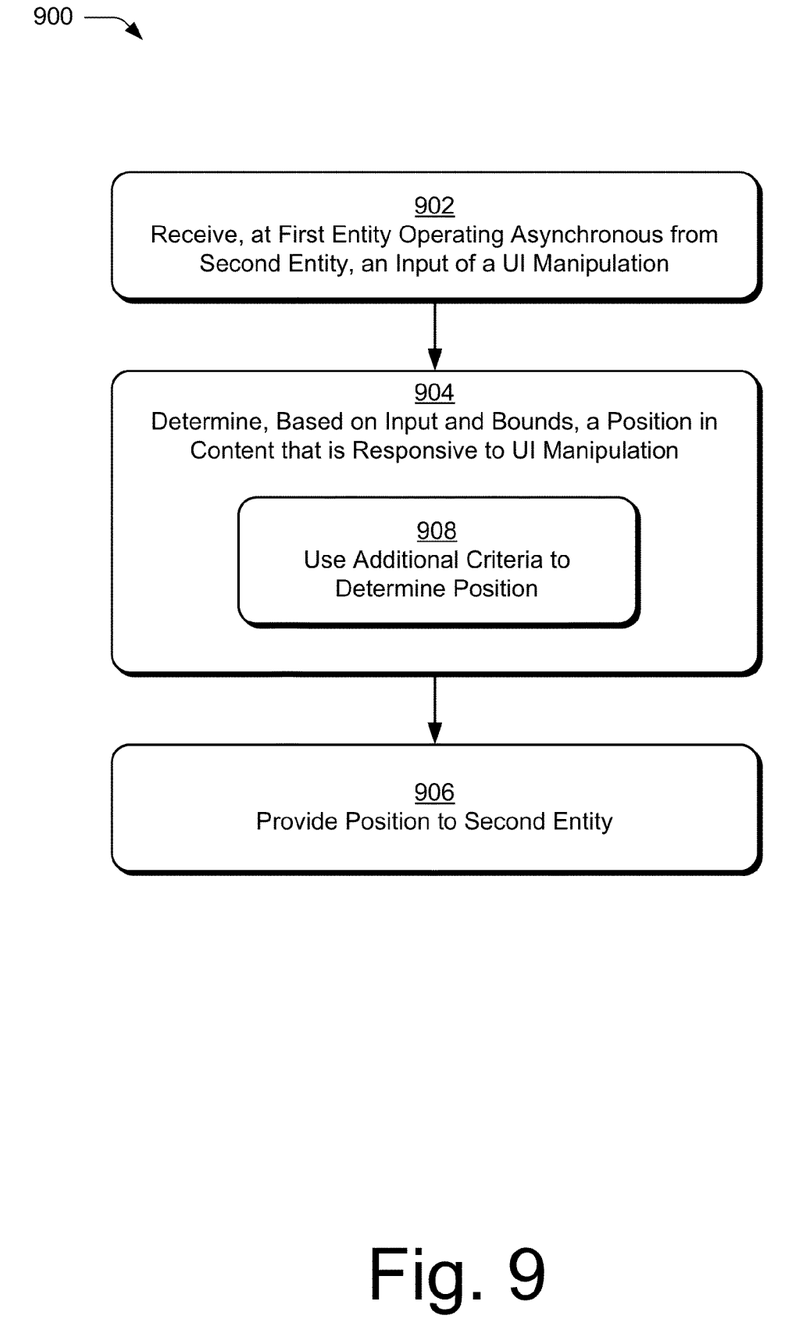
FIG. 9 illustrates an example method for asynchronous handling of a UI manipulation directed to two entities.

FIGS. 4 and 9 depict methods for asynchronous handling of a UI manipulation. FIG. 4 is directed to asynchronous handling of a UI manipulation having three separate entities. FIG. 9 is directed to asynchronous handling of a UI manipulation having two separate entities. In portions of the following discussion reference may be made to environment 100 of FIG. 1 and as detailed in FIGS. 2-3, reference to which is made for example only.

Block 402 receives, at a first entity, bounds of content capable of being displayed in an application interface. These bounds are useful in determining a position in the content that is responsive to a UI manipulation, such as a total size and/or resolution of the content capable of being displayed. Content may include, for example, a complete picture of which a part is displayed, a ten-page article of which a first page is shown, or a state-size map of which a city is shown.

Figure 5:
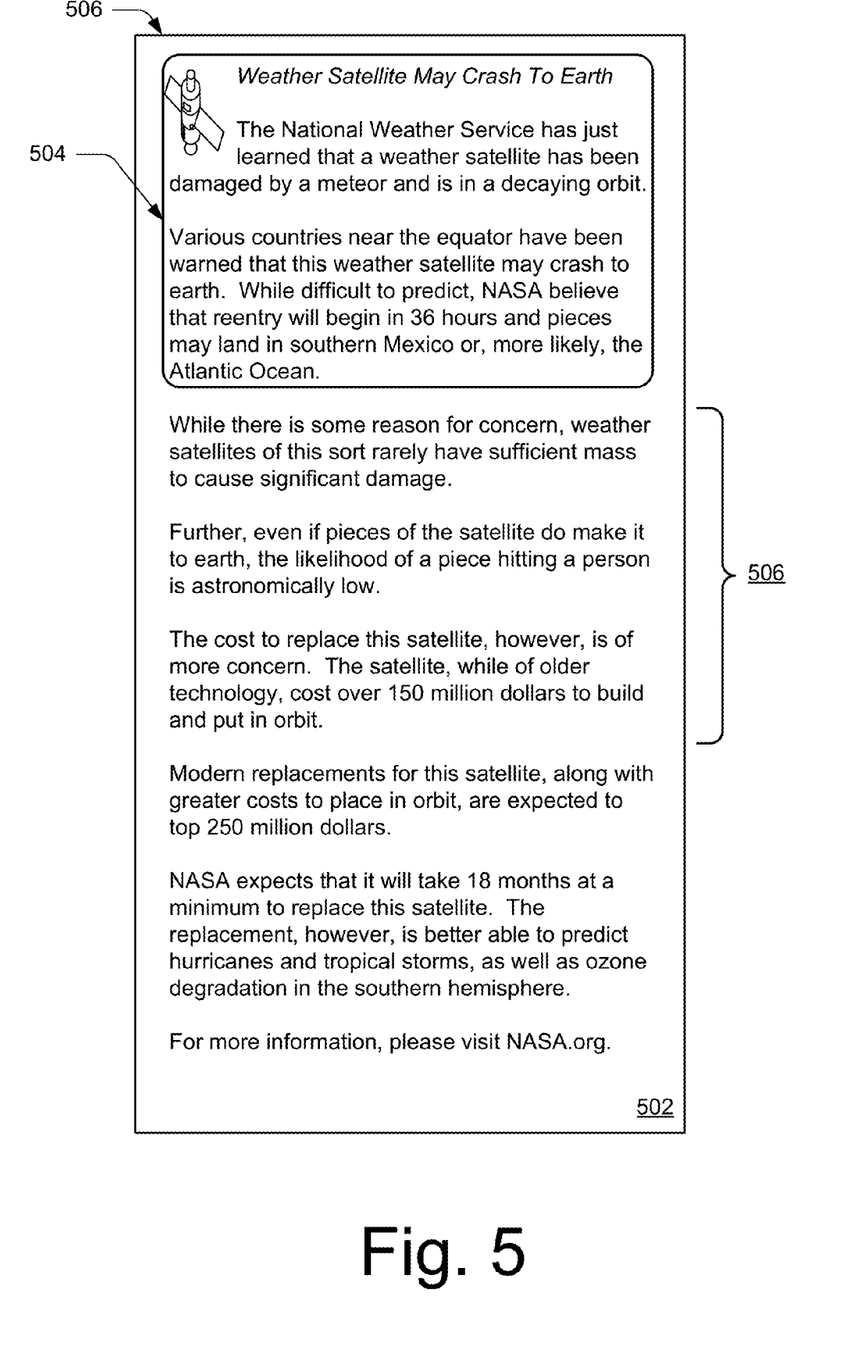
FIG. 5 illustrates, for a news article, content having bounds and a viewport in which a portion of the content is currently rendered in an application interface.

By way of example, consider FIG. 5, which illustrates content 502 and viewport 504. Viewport 504 shows the portion of content 502 currently rendered in application interface 216. Content 502 includes bounds 506, which here is a total size of the content in pixels, though bounds can include more, less, or different information, such as a number of pages in an article, size of each page, a total map size, current resolution, or potential resolutions (highest and lowest resolutions), to name just a few. For this example, however, consider bounds 506 to include the total size of content 502.

Block 404 receives or determines, at the first entity, a size and location of a viewport in which a portion of the content is currently displayed in the application interface. In some embodiments, only a simple position in the content is used rather than a size and location of a viewport. In cases where a potential position is adjusted for consistency and/or touch and feel of a user interface, however, a viewport size and location in content can be useful. Consistency and touch and feel are described in greater detail below.

Continuing the present example, at blocks 402 and 404 handler 210 receives the sizes of viewport 504 and content 502, and the location of viewport 504 in content 502. The sizes of viewport 504 and content 502 can be represented in X-Y coordinates and/or with a number of pixels, or in other formats.

Note that viewport 504 is one example of a viewport, another of which is shown at 112 in FIG. 1. Both of these viewports display a portion of their respective content. A user viewing application interface 216, in this example, sees a first page within viewport 504 of a three-page article concerning a weather satellite.

Figure 6:
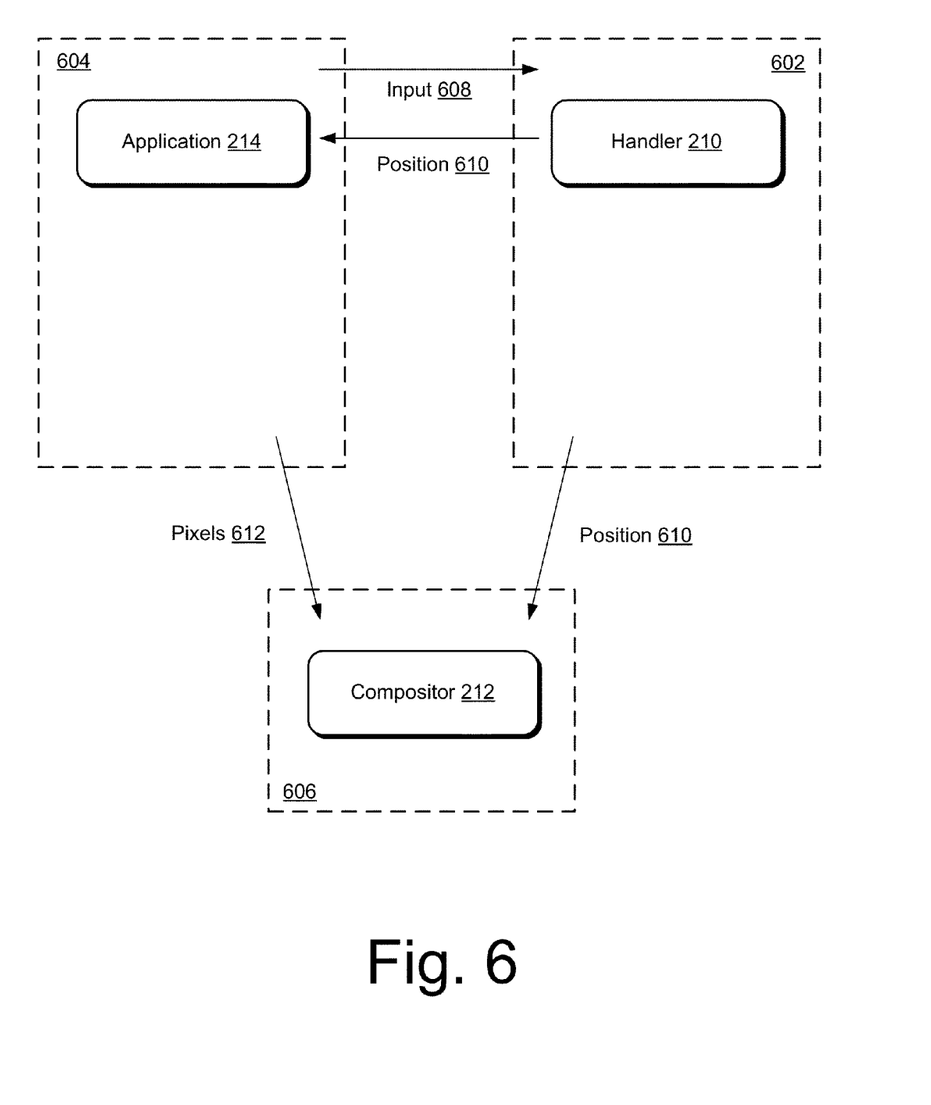
FIG. 6 illustrates asynchronous operation of three entities of FIG. 2 each within a different computational process.

Block 406 receives, at the first entity operating asynchronous from a second entity, an input of a UI manipulation. An example of an asynchronous operation is illustrated in FIG. 6. Here the first entity is handler 210 and the second entity is application 214. Handler 210, application 214, and compositor 212 are shown operating asynchronously as part of different computational processes 602, 604, and 606, respectively.

This input of the UI manipulation can be received from the second entity or otherwise. In the example environment 100 of FIG. 1 as detailed in FIGS. 2 and 3, for example, handler 210 may receive the input from application 214 or another entity, such as operating system 208. Handler 210 may also receive a request for a position in the content that is responsive to the UI manipulation, bounds of the content, and other information useful in determining a position. The UI manipulation does not have to be made by a user, though this is often the case. As noted above, this UI manipulation can be made by a user with a gesture through a direct-touch or indirect-touch device or otherwise.

Figure 7:
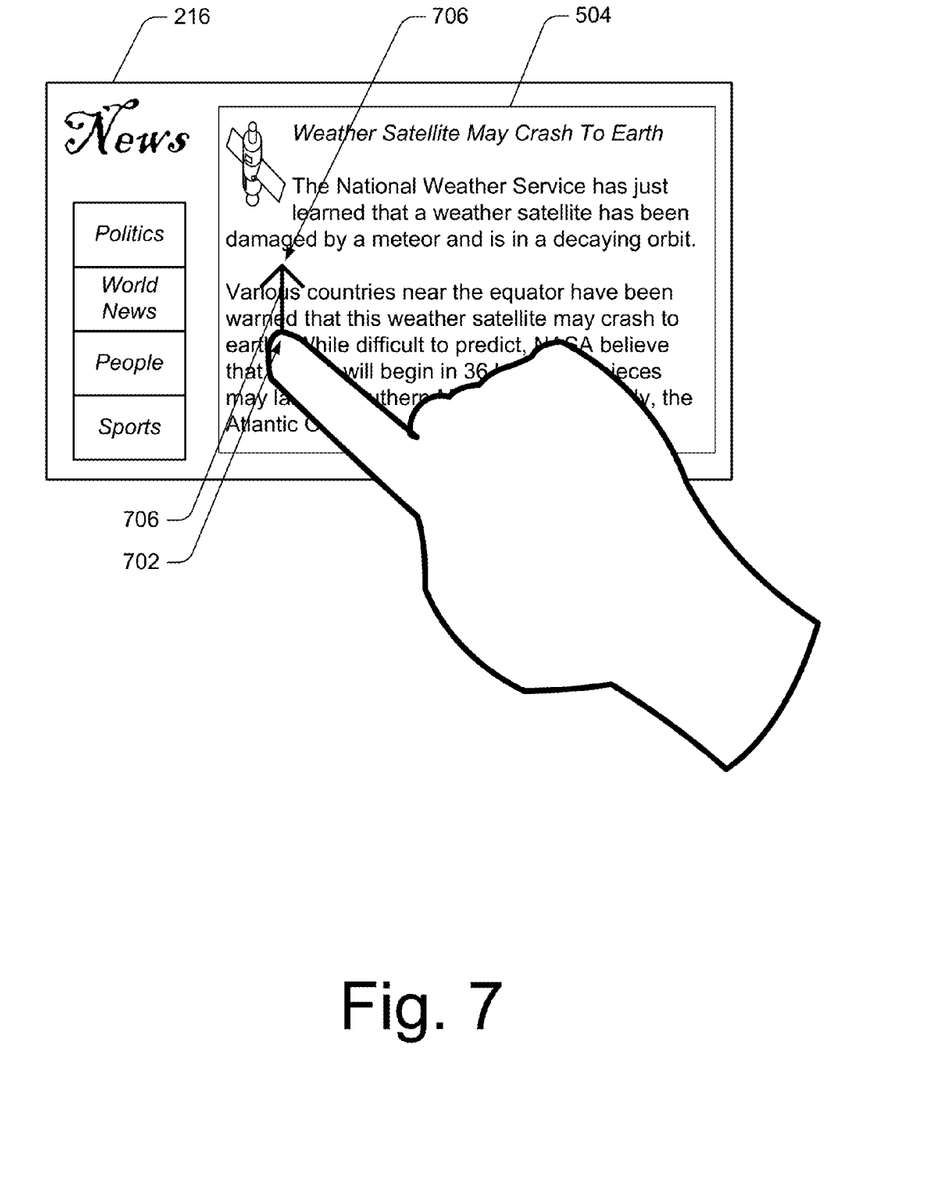
FIG. 7 illustrates a flick-up single-finger gesture made to an application interface rendering content of FIG. 5.

Continuing the ongoing example, assume that the input of the UI manipulation is received from application 214 and by handler 210 as shown in FIG. 6 with input 608. The UI manipulation is illustrated in FIG. 7 with an initial touch 702 to viewport 504 (also shown in FIG. 5) of application interface 216 at an [X,Y] position in pixels of [20,75] and a movement from that initial touch to an intermediate touch 704 having a second position of [20,50]. Thus, the UI manipulation in this example is a flick-up single-finger gesture 706 starting at [20,75] and moving to [20,50]. The input likely also includes other information, here a velocity and inertia of the gesture.

Block 408 determines, based on the input and the bounds, a position in the content at which a second portion of the content is associated, display of the second portion of the content in the application interface being responsive to the input to manipulate the content. Block 408 may determine a position based on criteria additional to the input and the bounds, some of which alter a position that would otherwise be used. These additional criteria are covered in greater detail below and include touch-and-feel aspects, such as providing a "bounce" at an end of the content or a section thereof, slowing or speeding up movement through the content, and "settling" to a particular point or resolution in the content to prevent overlapping sub-portions (e.g., stopping at a single picture of content having many pictures even though the potential position determined based on the input and bounds would land at portions of two pictures or stopping at an end of a page of content rather than show the end of one page and the beginning of another).

Block 408 may also determine a position based on responses supported for the content. These supported responses may be received from an application responsible for rendering the content, such as application 214, and indicate whether the application supports pan, zoom in, zoom out, or rotate, for example.

Continuing the ongoing example, hander 210 receives the locations, velocity, and inertia of the UI manipulation. With this information, as well as the bounds of the content, handler 210 determines a position in the content that is responsive to this UI manipulation (or portion thereof). Note that handler 210 is not occupied pre-rendering or rendering content associated with that position, instead with the position itself. By so doing, a user may experience a quick and responsive movement, such as the news article "sticking" to the user's finger in this example.

Based on the bounds and the input, handler 210 determines a new position, here a second page of the three-page news article shown in FIG. 5 at 506. This position determines, or can be used to determine, which content to render, though it does not include pre-rendering, rendering, or handling the content itself.

Pre-rendering and other aspects are addressed in more detail below. In this particular example, however, handler 210 passes, as part of a call-back operation, the position to the second entity, which here is application 214. This is shown in FIG. 6 with position 610 provided to application 214.

Block 410 provides the position to a third entity having access to pre-rendered content prepared by and/or received from the second entity. As noted above, pre-rendered content can include the second portion of the content effective to enable the third entity to display the second portion of the content in the application interface in response to the input to manipulate the content.

Figure 8:
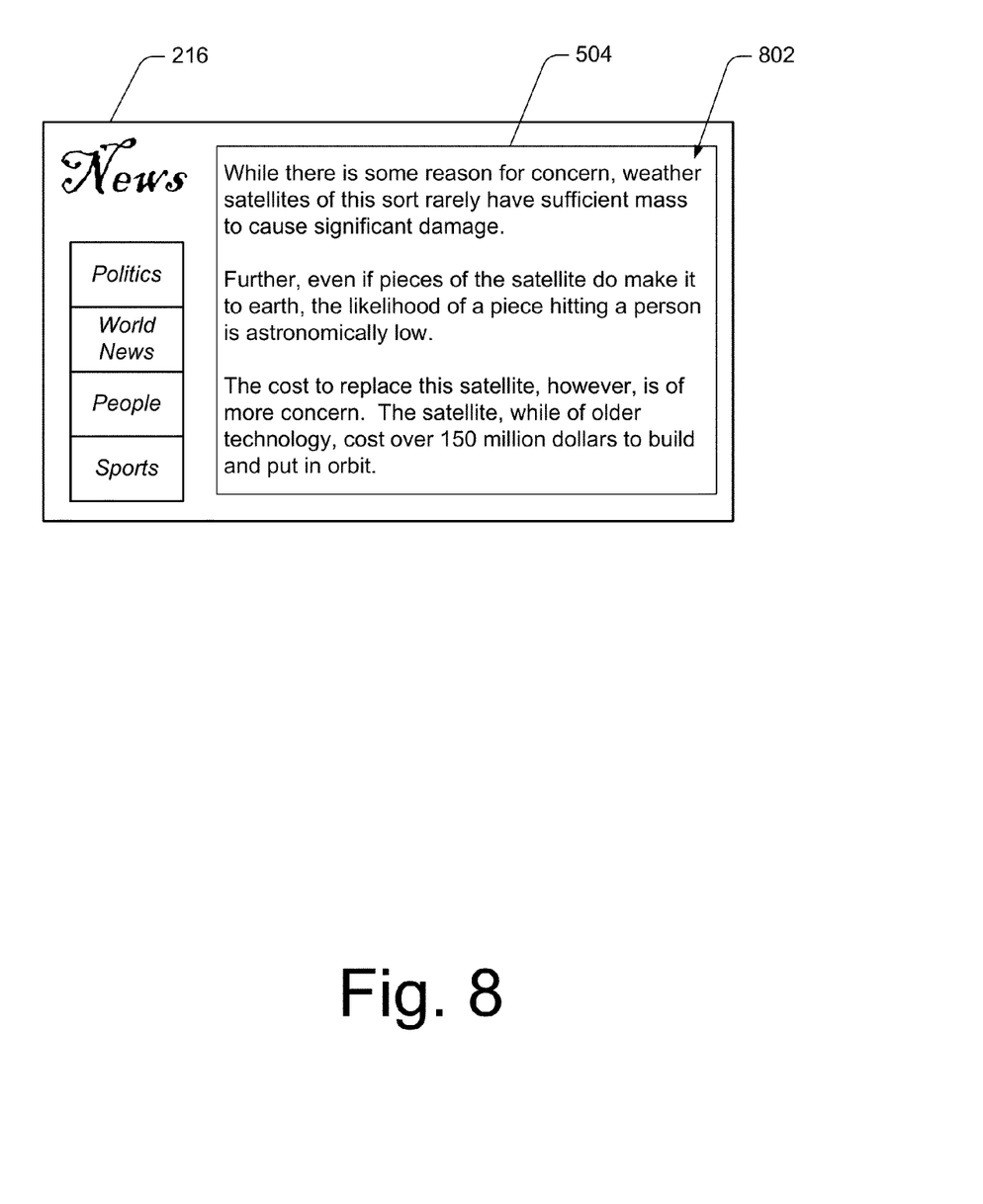
FIG. 8 illustrates a result of method 400, in which a second portion of content is rendered responsive to an input of a UI manipulation.

Returning to the ongoing example, handler 210 provides compositor 212 with position 610 (shown in FIG. 6) in content 502 of FIG. 5, the position indicating that the second page of the three-page news article should be rendered in response to the UI manipulation. Compositor 212 can quickly respond to the position information with previously pre-rendered content (e.g., pixels 612 of FIG. 6), which may have been pre-rendered and available to compositor 212 at some prior time. Compositor 212 may, in some cases, receive pre-rendered content from application 214 roughly concurrently to receiving the position from handler 210. This rendering of the second page of the news article is illustrated in FIG. 8 at 802.

In more detail, consider an example where input of a UI manipulation is received by handler 210 every eight milliseconds, which is often a refresh rate used for liquid crystal display (LCD) screens. Here assume that handler 210, by operating asynchronously from and in a separate process to that of a user interface process in which application 214 operates, is able to provide a position to compositor 212 faster than the refresh rate of the display. In this way a user's manipulations can "stick" to the user's input device (finger, stylus, mouse arrow, etc.) because the content is shown moving with the input device.

Note that content available to compositor 212 can be presented in immediate response to the manipulation, even as the manipulation is being made. In some cases an entity responsible for providing pre-rendered content may not have this content immediately available to compositor 212, as pre-rendering content can take 70 to 200 milliseconds in some devices. Even so, however, the entity is likely able to provide the pre-rendered content more quickly than if the entity also is responsible for the position-based operations of handler 210. Further, even if some content to be displayed is not pre-rendered for compositor 212, the content that has been pre-rendered can be used to provide a very good user experience.

Method 400 may be repeated, in whole or in part, effective to provide multiple, real-time positions in response to a UI manipulation, such as when a UI manipulation includes numerous inputs.

As noted above, FIG. 4 includes three entities, the examples directed to handler 210, compositor 212, and application 214. FIG. 9 is described below and includes two entities, the examples directed to handler 210 and application 214. The examples also further describe additional criteria used in determining positions, such as the above-mentioned touch-and-feel aspects.

Block 902 operates similarly to block 406 of FIG. 4, and receives, at a first entity operating asynchronously from a second entity, input of a UI manipulation. Block 902 may be preceded by receiving bounds of content and receiving or determining a size and location of a viewport, as noted in FIG. 4.

Figure 10:
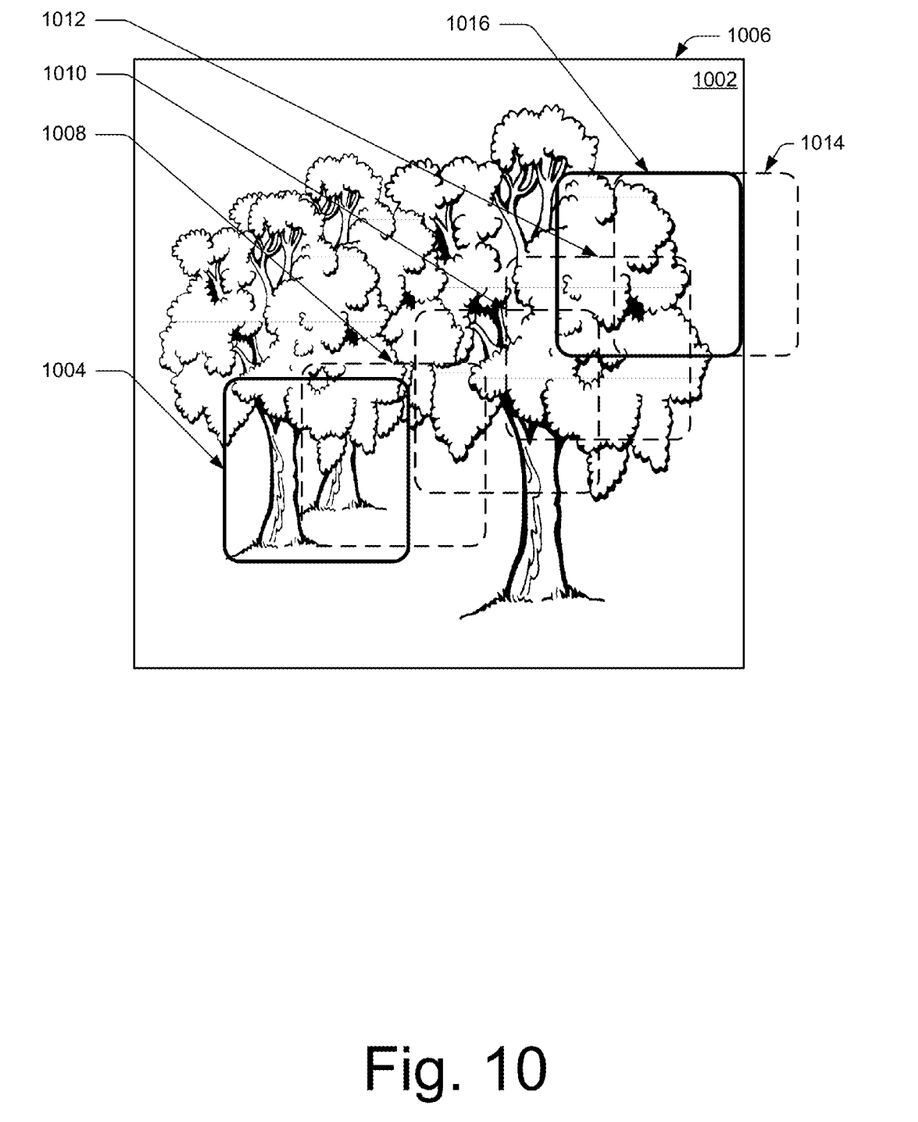
FIG. 10 illustrates, for an image, content having bounds and viewports in which a portion of that content is or may later be rendered in an application interface.

By way of example, consider FIG. 10, which illustrates content 1002 and viewport 1004. Viewport 1004 shows the portion of content 1002 currently rendered in application interface 216. Content 1002 includes bounds 1006, which here is a total size of the content. Assume also that the size and location of viewport 1004 is known by hander 210.

Assume also that hander 210 receives an input of a UI manipulation having multiple inputs from application 214, the multiple inputs selecting to move viewport 1004 across content 1002 and overshoot its bounds 1006.

Block 904 determines, based on the input, the bounds, and in some alternative cases the viewport size and location, a position in the content at which a second portion of the content is associated. As above, this second portion of the content is responsive to the input of the UI manipulation.

For the ongoing example, assume that handler 210 determines a position based on the input, bounds, and viewport. Thus, for a first three iterations of method 900, at which inputs for the UI manipulation are received, handler 210 determines positions 1008, 1010, and 1012 for viewports (e.g., positions in content 1002 to render portions of content, but not the content itself), shown with dashed viewport-sized positions. A user viewing application interface 216, for example, sees two tree trunks within viewport 1004 of a larger image have three trees and accompanying foliage, and later in the example will see content within positions 1008, 1010, and 1012.

Block 906 provides a position for the input to the second entity effective to enable the second entity to render the second portion of the content at the position and in the application interface in response to the input to manipulate the content. As noted, hander 210 provides, in response to a first input for the UI manipulation, position 1008 to application 214. Application 214 then displays the content shown within the viewport at position 1008 within application interface 216. On further iterations of method 900, handler 210 provides positions 1010 and 1012 in response to which application 214 renders content associated with these positions. Rendering content in this example is performed by application 214. This example assumes that all of content 1002 is pre-rendered by application 214 and is thus quickly available to render once these positions are received. In some cases, however, application 214 may also pre-render the content.

In some cases, however, the techniques determine a position based on additional criteria, some of which affects a position that would otherwise be responsive to the input and bounds. Consider position 1014 of FIG. 10. This position overshoots bounds 1006 of content 1002. As such, handler 210 could provide this position, in response to which application 214 may render the content within the position and present some blank space.

Alternatively or additionally, the techniques may consider this and other aspects to provide a position having a certain look and feel or other user experience. Here assume that handler 210 calculates position 1014 and, based on it overshooting bounds 1006, instead provides two positions to application 214 at block 906. Consider alternate aspects of block 904, where handler 210, at block 908, uses additional criteria to determine the position. These additional criteria may be used all the time, sometimes, rarely, or responsive to some other determination, including as part of method 400. Here handler 210 determines first that position 1014 will overshoot bounds 1006 based on the input and the size and prior location of the viewport (viewport 1004 is large enough to partially overshoot). In response to this determination, handler 210 determines to end the UI manipulation at position 1016 (shown with solid lines). Handler 210 can also provide other positions to application 214 to show that this is the end/edge the content, such as a "bounce" position.

The preceding discussion describes methods relating to asynchronous handling of a UI manipulation. Aspects of these methods may be implemented in hardware (e.g., fixed logic circuitry), firmware, software, manual processing, or any combination thereof A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in environment 100 of FIG. 1 including as detailed in FIG. 2 or 3, and/or example device 1100 described below, which may be further divided, combined, and so on. Thus, environment 100 and/or device 1100 illustrate some of many possible systems or apparatuses capable of employing the described techniques. The entities of environment 100 and/or device 1100 generally represent software, firmware, hardware, whole devices or networks, or a combination thereof In the case of a software implementation, for instance, the entities (e.g., handler 210, compositor 212, applications 214, and services 306) represent program code that performs specified tasks when executed on a processor (e.g., processor (s) 202 and/or 302). The program code can be stored in one or more computer-readable memory devices, such as media 204, provider media 304, or computer-readable media 1114 of FIG. 11.

Example Device

Figure 11:
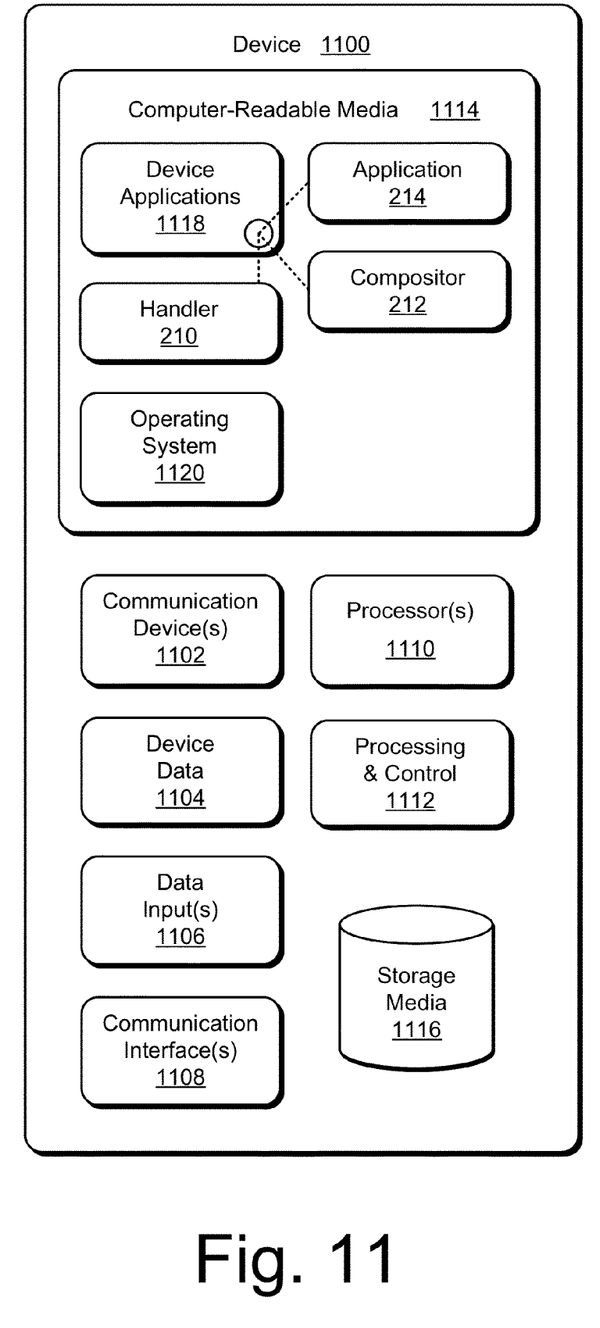
FIG. 11 illustrates an example device in which techniques for asynchronous handling of a user interface manipulation can be implemented.

FIG. 11 illustrates various components of example device 1100 that can be implemented as any type of client, server, and/or computing device as described with reference to the previous FIGS. 1-8 to implement techniques for asynchronous handling of a UI manipulation. In embodiments, device 1100 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1100 may also be associated with a user (e.g., a person) and/or an entity that operates the device such that a device describes logical devices that include users, software, firmware, and/or a combination of devices.

Device 1100 includes communication devices 1102 that enable wired and/or wireless communication of device data 1104 (e.g., received data, data that is being received, data scheduled for broadcast, data packets of the data, etc.). The device data 1104 or other device content can include configuration settings of the device, media content stored on the device, and/or information associated with a user of the device. Device 1100 includes one or more data inputs 1106 via which any type of data, media content, and/or inputs can be received, such as human utterances, user-selectable inputs (gestures or otherwise), messages, music, television media content, recorded video content, and any other type of data received from any content and/or data source.

Device 1100 also includes communication interfaces 1108, which can be implemented as any one or more of a serial and/or parallel interface, a wireless interface, any type of network interface, a modem, and as any other type of communication interface. The communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like), which process various computer-executable instructions to control the operation of device 1100 and to enable techniques for asynchronous handling of a UI manipulation. Alternatively or in addition, device 1100 can be implemented with any one or combination of hardware, firmware, or fixed logic circuitry that is implemented in connection with processing and control circuits which are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable storage media 1114, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage media device 1116.

Computer-readable storage media 1114 provides data storage mechanisms to store the device data 1104, as well as various device applications 1118 and any other types of information and/or data related to operational aspects of device 1100. For example, an operating system 1120 can be maintained as a computer application with the computer-readable storage media 1114 and executed on processors 1110. The device applications 1118 may include a device manager, such as any form of a control application, software application, signal-processing and control module, code that is native to a particular device, a hardware abstraction layer for a particular device, and so on.

The device applications 1118 also include any system components, engines, or modules to implement techniques for asynchronous handling of a UI manipulation. In this example, the device applications 1118 can include handler 210, compositor 212, and applications 214.

Conclusion

Although embodiments of techniques and apparatuses for asynchronous handling of a UI manipulation have been described in language specific to features and/or methods, it is to be understood that the subject of the appended claims is not necessarily limited to the specific features or methods described. Rather, the specific features and methods are disclosed as example implementations for asynchronous handling of a UI manipulation.

What is claimed is:

1. A computer-implemented method comprising:
    receive, at a first entity operating asynchronous from a second entity, an input from a user interface (UI) manipulation of content, a first portion of the content presented in an application interface through which the UI manipulation is made, the input comprising a velocity of the UI manipulation;
    determine, based on the input and bounds of the content, a position in the content at which a second portion of the content is associated, display of the second portion of the content in the application interface being responsive to the UI manipulation; and
    provide the position to a third entity having access to pre-rendered content prepared by the second entity, the pre-rendered content including at least the second portion of the content effective to enable the third entity to display, based on the position, the second portion of the content in the application interface in response to the UI manipulation.

2. A computer-implemented method as described in claim 1, wherein determine the position is further based on criteria additional to the input and the bounds, the criteria indicating that a potential position responsive to the input will overlap sub-portions of the content or overshoot the bounds of the content.

3. A computer-implemented method as described in claim 2, wherein the position causes the second portion of the content to not overlap sub-portions or overshoot the bounds of the content.

4. A computer-implemented method as described in claim 1, wherein determine the position is further based on a size of a viewport in which the first portion of the content is displayed in the application interface.

5. A computer-implemented method as described in claim 1, wherein determine the position is further based on responses supported by the second entity.

6. A computer-implemented method as described in claim 5, wherein the responses supported by the second entity include a pan, a zoom, a rotate, a transform, or a translation.

7. A computer-implemented method as described in claim 1, wherein the input further includes an inertia of the UI manipulation, and wherein determining the position is further based on the inertia.

8. A computer-implemented method as described in claim 1, wherein the position provided to the third entity includes a location in the content, a resolution change, or an orientation change.

9. A computer-implemented method as described in claim 1, wherein the bounds of the content include a total size or resolution of the content that is capable of being displayed in a viewport of the application interface.

10. A computer-implemented method as described in claim 1, further comprising:
    providing the position to the second entity prior to providing the position to third entity effective to enable the second entity to pre-render the pre-rendered content having at least the second portion of the content.

11. A computer-implemented method as described in claim 1, further comprising repeating the method for later inputs from the UI manipulation effective to provide multiple, real-time positions responsive to the respective later inputs.

12. A computer-implemented method as described in claim 1, wherein the input is received at the first entity and from the second entity, the second entity requesting the position from the first entity by which the second entity pre-renders content based on the position.

13. A computer-implemented method as described in claim 1, wherein the first entity and the second entity operating asynchronously includes operating within different respective CPU threads.

14. A computer-implemented method as described in claim 13, wherein the CPU thread in which the first entity operates is a dedicated user-manipulation thread not performing pre-rendering.

15. A computer-implemented method as described in claim 1, wherein the second portion of the content is pre-rendered and accessible by the third entity prior to the UI manipulation being made.

16. A computer-implemented method comprising:
   receive, at a first entity operating asynchronous from a second entity, an input from a user interface (UI) manipulation of content, a first portion of the content presented in an application interface in which the UI manipulation is made, the input comprising a velocity of the UI manipulation;
   determine, based on the input and bounds of the content, a position in the content at which a second portion of the content is associated, display of the second portion of the content in the application interface being responsive to the UI manipulation; and
   provide the position to the second entity effective to enable the second entity to render the second portion of the content at the position and in the application interface in response to the UI manipulation.

17. A computer-implemented method as described in claim 16, wherein determine the position is further based on:
   a size of a viewport in which the first portion of the content is displayed in the application interface or in which the second portion of the content will be displayed in the application interface; and
   criteria additional to the input and the bounds, the criteria indicating that a potential position responsive to the input will, at the size of the viewport, overlap sub-portions of the content or overshoot the bounds of the content, wherein the position causes the second portion of the content to not overlap sub-portions or overshoot the bounds of the content, respectively.

18. A computer-implemented method as described in claim 16, wherein the first entity operates in a computational process that does not perform pre-rendering and the second entity operates in a different computational process that does perform pre-rendering.

19. A computer-implemented method as described in claim 16, wherein the second entity is an application responsible for rendering content in the application interface.

20. A computer-implemented method comprising:
   receive, at a first entity operating asynchronous from a second entity, bounds of content capable of being displayed in an application interface;
   receive or determine, at the first entity, a size and location of a viewport of the application interface;
   receive, at the first entity, an input from a user interface (UI) manipulation of the content a first portion of which is presented in the viewport of the application interface, the input comprising a velocity of the UI manipulation;
   determine, based on the input, the bounds, and the size and location of the viewport, a position in the content at which a second portion of the content is associated, display of the second portion of the content in the application interface being responsive to the input; and
   provide the position to a third entity having access to pre-rendered content prepared by and received from the second entity, the pre-rendered content including at least the second portion of the content effective to enable the third entity to display, based on the position, the second portion of the content in the viewport of the application interface in response to the input from the UI manipulation.

* * * * *